United States Patent
Koike et al.

(10) Patent No.: US 11,110,785 B2
(45) Date of Patent: Sep. 7, 2021

(54) VEHICLE REAR PORTION STRUCTURE

(71) Applicant: TOYOTA JIDOSHA KABUSHIKI KAISHA, Toyota (JP)

(72) Inventors: Hiroyuki Koike, Toyota (JP); Junichi Shimasaki, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 318 days.

(21) Appl. No.: 16/044,828

(22) Filed: Jul. 25, 2018

(65) Prior Publication Data

US 2019/0039446 A1 Feb. 7, 2019

(30) Foreign Application Priority Data

Aug. 2, 2017 (JP) .............. JP2017-149818
Nov. 7, 2017 (JP) .............. JP2017-214853

(51) Int. Cl.
*B60K 15/07* (2006.01)
*B60K 1/04* (2019.01)
*B60K 15/03* (2006.01)
*B60K 15/063* (2006.01)

(52) U.S. Cl.
CPC ............. *B60K 1/04* (2013.01); *B60K 15/07* (2013.01); *B60K 2001/0416* (2013.01); *B60K 2015/03315* (2013.01); *B60K 2015/0638* (2013.01); *B60Y 2306/01* (2013.01)

(58) Field of Classification Search
CPC ............ B60K 1/04; B60K 2001/0416; B60K 2001/0405; B60K 15/07; B60K 2015/0638; B60K 2015/03315
See application file for complete search history.

(56) References Cited

U.S. PATENT DOCUMENTS

| | | | | |
|---|---|---|---|---|
| 3,866,704 A | * | 2/1975 | Bowers | B60R 16/04 180/68.5 |
| 6,129,166 A | * | 10/2000 | Sueshige | B60K 1/00 180/65.6 |
| 6,449,882 B2 | * | 9/2002 | Kono | E01H 5/04 37/266 |
| 7,014,002 B2 | * | 3/2006 | Mizuta | B60R 16/04 180/68.5 |
| 7,108,091 B2 | * | 9/2006 | Guidry | B60K 1/00 180/68.1 |
| 7,219,758 B2 | * | 5/2007 | Guidry | B60K 1/00 180/65.31 |
| 7,331,559 B2 | * | 2/2008 | Hirayu | B60R 16/04 180/68.5 |
| 7,614,473 B2 | * | 11/2009 | Ono | B60K 1/04 180/299 |

(Continued)

FOREIGN PATENT DOCUMENTS

DE 102 29 048 A1 1/2004
DE 10 2010 040 668 A1 3/2012
(Continued)

*Primary Examiner* — Emma K Frick
(74) *Attorney, Agent, or Firm* — Oliff PLC

(57) ABSTRACT

In a vehicle rear portion of a vehicle, a third hydrogen tank is disposed between a left and right pair of rear side members that structure portions of the vehicle body and extend in the vehicle front-and-rear direction. An auxiliary battery is disposed at a vehicle width direction outer side of the rear side members.

18 Claims, 9 Drawing Sheets

(56) References Cited

U.S. PATENT DOCUMENTS

| | | | |
|---|---|---|---|
| 8,550,196 B2* | 10/2013 | Ross | B60L 1/003 |
| | | | 180/65.285 |
| 8,678,023 B2* | 3/2014 | Yahashi | B60K 15/07 |
| | | | 123/529 |
| 8,955,632 B2* | 2/2015 | Schurna | B62D 23/005 |
| | | | 180/210 |
| 9,254,874 B2* | 2/2016 | De Luca | B62D 25/2027 |
| 9,415,672 B2 | 8/2016 | Lee et al. | |
| 10,300,788 B2* | 5/2019 | Nishiumi | B60K 1/04 |
| 10,889,334 B2* | 1/2021 | Tatsuwaki | B62D 21/152 |
| 2005/0093287 A1 | 5/2005 | Kondo | |
| 2006/0032683 A1* | 2/2006 | Kejha | B62D 23/005 |
| | | | 180/65.1 |
| 2007/0039767 A1 | 2/2007 | Kondo | |
| 2013/0025950 A1* | 1/2013 | Brandon | B60K 1/04 |
| | | | 180/65.1 |
| 2013/0249243 A1 | 9/2013 | Lee et al. | |
| 2017/0183037 A1 | 6/2017 | Kato et al. | |
| 2018/0370368 A1* | 12/2018 | Kronsteiner | H01M 10/425 |
| 2019/0263450 A1* | 8/2019 | Inoue | B60K 15/03006 |

FOREIGN PATENT DOCUMENTS

| | | |
|---|---|---|
| JP | 2009-190523 A | 8/2009 |
| JP | 2012-041025 A | 3/2012 |
| JP | 2014-129042 A | 7/2014 |
| JP | 2017-114411 A | 6/2017 |
| WO | 2003/104010 A1 | 12/2003 |

* cited by examiner

VEHICLE REAR PORTION STRUCTURE

CROSS-REFERENCE TO RELATED APPLICATION

This application is based on and claims priority under 35 USC 119 from Japanese Patent Application No. 2017-149818 filed on Aug. 2, 2017, and Japanese Patent Application No. 2017-214853 filed on Nov. 7, 2017, the disclosure of which are incorporated by reference herein.

TECHNICAL FIELD

The present disclosure relates to a vehicle rear portion structure, and particularly relates to a vehicle rear portion structure at which a hydrogen tank and a battery are disposed in a vehicle rear portion.

RELATED ART

In a hydrogen cell vehicle, a hydrogen tank that stores hydrogen may be mounted at a vehicle rear portion.

In a vehicle rear portion structure recited in Japanese Patent Application Laid-Open (JP-A) No. 2009-190523 (Patent Document 1), two hydrogen tanks that are adjacent to front and rear are mounted below rear side members of a vehicle rear portion, via a tank frame. A kick-up portion is provided at each rear side member between mounting positions of the two hydrogen tanks. The kick-up portion serves as an easily deformable portion at which the rear side member is inflected vertically by a collision load from the rear. Therefore, the rear side members may be deformed to inflect at the kick-up portions by a collision load applied during a rear collision, and impact absorption characteristics may be improved.

In the vehicle rear portion structure recited in Patent Document 1, the rear side members are locally reinforced by the tank frame being attached to the rear side members. A battery is placed on a luggage compartment rear floor panel above the region in which the rear side members are reinforced. With this structure, damage to the battery during a rear collision of the vehicle is suppressed in the vehicle rear portion structure recited in Patent Document 1.

However, in the vehicle rear portion structure recited in Patent Document 1, a main space at a vehicle width direction middle region of the luggage compartment is narrowed by the battery and usability of the luggage compartment is poor. If, as an alternative, a battery is disposed below a deckboard or the like to the rear of a hydrogen tank, the battery may be sandwiched between the hydrogen tank and a collision object during a rear collision, which is undesirable with regard to protecting the battery. Furthermore, with regard to suppressing contact with other components and protecting the battery, it is desirable if a fixed state of the battery at a predetermined position of the vehicle body is maintained even when rear side members are deformed during a rear collision.

SUMMARY

In consideration of the circumstances described above, an object of the present disclosure is to provide, in a vehicle in which a hydrogen tank and a battery are equipped at a vehicle rear portion, a vehicle rear portion structure that may provide both usability of a luggage compartment and battery protection performance during a rear collision.

A vehicle rear portion structure according to a first aspect includes: a left and right pair of rear side members that structure portions of a vehicle body at a vehicle rear portion, the rear side members extending in the vehicle front-and-rear direction and being disposed apart in the vehicle width direction; a hydrogen tank that is disposed between the left and right pair of rear side members and is fixed to the vehicle body; a floor panel that is disposed at a vehicle width direction outer side of the vehicle rear portion, a vehicle width direction inner end portion of the floor panel being fixed to one of the rear side members and the floor panel extending to the vehicle width direction outer side relative to one of the rear side members; a battery that is disposed on the floor panel at the vehicle width direction outer side of one of the rear side members; and a battery clamp, a vehicle width direction inner end portion of which is fixed to one of the rear side members, the battery clamp extending toward the vehicle width direction outer side to an upper portion of the battery, and the battery clamp and the floor panel sandwiching and retaining the battery from above and below.

In the vehicle rear portion structure according to the first aspect, because the battery is disposed on the floor panel at the vehicle width direction outer side of the rear side members, the battery does not utilize a main space at a vehicle width direction middle region of a luggage compartment, and usability of the luggage compartment is better. Moreover, whereas the battery is disposed at a vehicle width direction outer side of the rear side members, the hydrogen tank is disposed between the pair of rear side members. Thus, the battery is offset in the vehicle width direction from the hydrogen tank that has higher strength. Therefore, when a collision load from the rear during a rear collision of the vehicle is borne by the rear side members and the rear side members are deformed, sandwiching of the battery between the hydrogen tank and a collision object may be suppressed.

Furthermore, because sandwiching of the battery between the hydrogen tank and a collision object is suppressed, a large external force is less likely to act on the battery, and the battery clamp is less likely to deform. Therefore, the battery can be retained between the battery clamp and the floor panel, and a fixed state of the battery to the vehicle body is maintained.

In a vehicle rear portion structure according to a second aspect, in the first aspect, each rear side member includes a curved portion that is curved into an upper side protrusion in an arch shape in a vehicle side view, the each rear side member extends in the vehicle front-and-rear direction to the vehicle front-and-rear direction rear relative to the curved portion, and the battery is disposed on the floor panel at the vehicle width direction outer side of one of the rear side members at the vehicle front-and-rear direction rear side relative to the curved portion; and the vehicle rear portion structure further includes a floor reinforcement that is fixed to the floor panel at a lower portion of the floor panel, a vehicle width direction inner end portion of the floor reinforcement being fixed to one of the rear side members, and the floor reinforcement extending toward the vehicle width direction outer side to a location at which the battery is disposed on the floor panel.

In the vehicle rear portion structure according to the second aspect, when a collision load from the rear during a rear collision of the vehicle is borne by the rear side member, because each rear side member is curved into an upper side protrusion in an arch shape at the curved portion, a region of the rear side member at the rear relative to the curved portion easily deforms so as to lift up about the rear end of the curved portion. Thus, energy is steadily absorbed during the rear collision. At this time, because the floor panel below the battery is reinforced by the floor reinforcement, the battery may be lifted up integrally with the floor panel, tracking the deformation of the rear side members. Therefore, the fixed state of the battery to the vehicle body may be maintained.

In a vehicle rear portion structure according to a third aspect, the second aspect further includes a bracket that is fixed to the floor reinforcement at a lower portion of the floor reinforcement, the bracket forming a chamber between the bracket and the floor reinforcement as viewed in the vehicle front-and-rear direction.

In the vehicle rear portion structure according to the third aspect, because the floor panel below the battery is further reinforced by the bracket, when the rear side member deforms during a rear collision, the battery may be further caused to track the deformation of the rear side members. Therefore, the fixed state of the battery to the vehicle body may be better maintained.

In a vehicle rear portion structure according to a fourth aspect, any one of the first to third aspects further includes: a battery carrier that is fixed to the floor panel between the battery and the floor panel, the battery being placed on the battery carrier; and an outer side connection portion that extends in the vehicle vertical direction at the vehicle width direction outer side of the battery, an upper end of the outer side connection portion being connected with a vehicle width direction outer end portion of the battery clamp, and a lower end of the outer side connection portion being connected with a vehicle width direction outer end portion of the battery carrier.

In the vehicle rear portion structure according to the fourth aspect, the battery is easily retained between the battery clamp and the floor panel, and the fixed state of the battery to the vehicle body may be maintained.

In a vehicle rear portion structure according to a fifth aspect, in any one of the first to fourth aspects, the battery and the rear side members overlap in a vehicle side view.

In the vehicle rear portion structure according to the fifth aspect, because the battery overlaps with the rear side members in side view, the battery and the hydrogen tank are separated by one of the rear side members. Therefore, sandwiching of the battery between the hydrogen tank and a collision body when the rear side members are deformed during a rear collision may be further suppressed. Furthermore, space in the vehicle vertical direction may be used more efficiently than in a structure in which the battery is provided above the rear side members, and an increase in size of the vehicle rear portion may be suppressed.

In a vehicle rear portion structure according to a sixth aspect, any one of the first to fifth aspects further includes a left and right pair of second members that extend in the vehicle front-and-rear direction at the vehicle width direction inner sides of the pair of rear side members.

In the vehicle rear portion structure according to the sixth aspect, because the battery and the hydrogen tank are separated by one of the second members, sandwiching of the battery between the hydrogen tank and a collision object when the rear side members are deformed during a rear collision may be even further suppressed.

In a vehicle rear portion structure according to a seventh aspect, in any one of the second to sixth aspects, each rear side member includes: a front member at which the curved portion is formed; and a rear member that is connected with the front member at a rear end portion of the curved portion and that extends to the vehicle front-and-rear direction rear.

In the vehicle rear portion structure according to the seventh aspect, because a connection portion between the front member and the rear member is provided at the rear end portion of the curved portion of the rear side member, rear portions of the rear side members easily deform so as to lift up about the connection portions at the rear ends of the curved portions, and energy of a rear collision is more steadily absorbed. Therefore, a large external force is less likely to act on the battery, and the battery clamp is less likely to be deformed. Therefore, the battery can be retained between the battery clamp and the floor panel, and a fixed state of the battery to the vehicle body is maintained.

As described above, the vehicle rear portion structure according to the present disclosure has excellent effects in that a vehicle rear portion structure may be provided that may provide both usability of a luggage compartment and battery protection performance during a rear collision.

DETAILED DESCRIPTION

Herebelow, an exemplary embodiment of a vehicle rear portion structure according to the present disclosure is described using FIG. 1 to FIG. 9. An arrow FR that is shown as appropriate in these drawings indicates a vehicle front side, an arrow UP indicates a vehicle upper side, and an arrow OUT indicates a vehicle width direction outer side. In the following descriptions, where the directions front, rear, up, down, left and right are used without being particularly specified, the same represent the front and rear in the vehicle front-and-rear direction, up and down in the vehicle vertical direction, and left and right if facing in the forward progress direction.

—Overall Structure of the Vehicle Rear Portion Structure—

Figure 1:
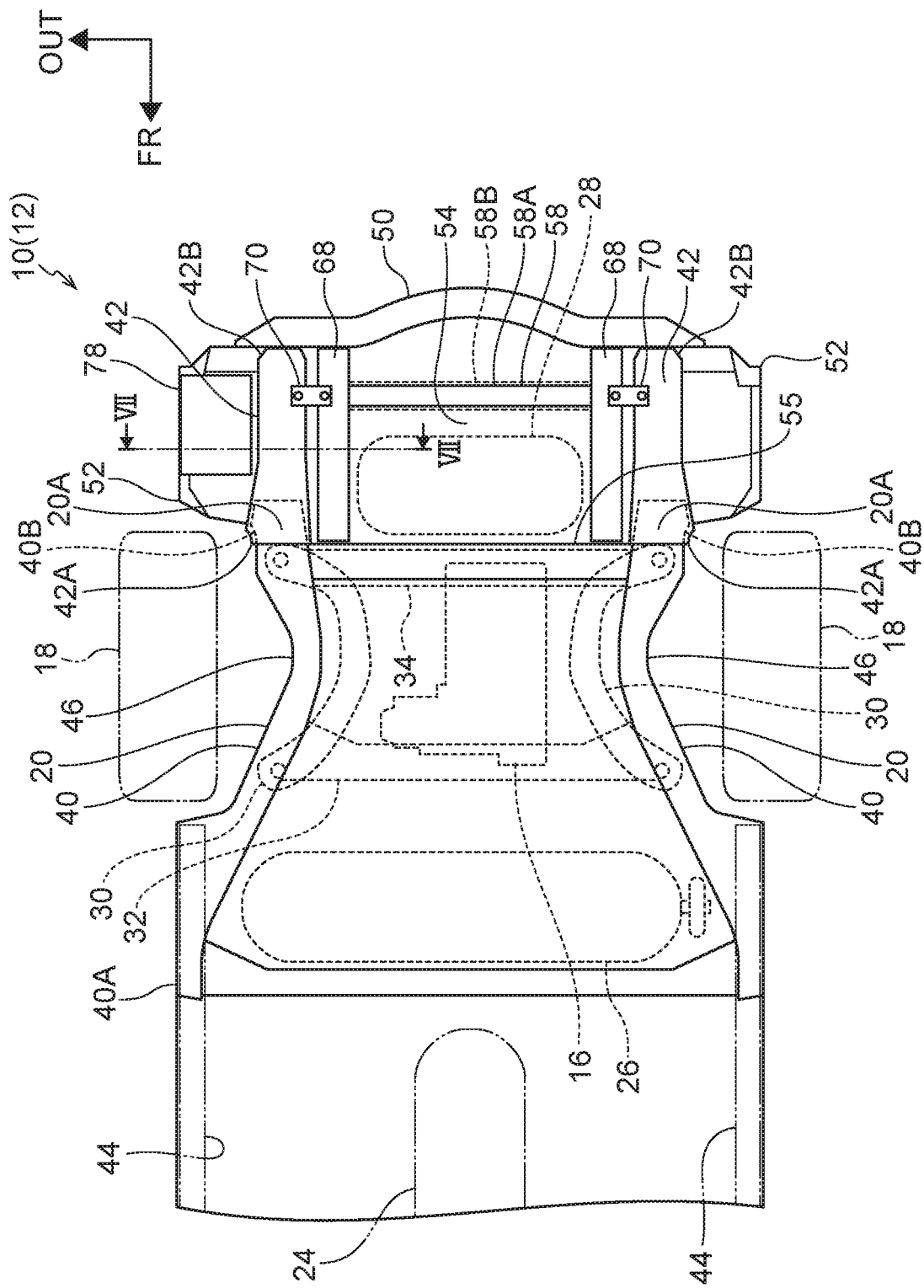
FIG. 1 is a plan view showing a vehicle rear portion structure according to an exemplary embodiment of the present disclosure.

FIG. 1 is a plan view showing a vehicle rear portion 12 of a vehicle 10 equipped with the vehicle rear portion structure according to the present exemplary embodiment. The vehicle 10 is a rear-wheel-drive fuel cell vehicle. The vehicle 10 makes optimal use of two energy sources: a fuel cell (FC), which is not shown in the drawings, and a high voltage (HV) battery 14. A motor, which is not shown in the drawings, is disposed inside a transaxle 16. The motor is driven by the energy sources and drives a left and right pair of rear wheels 18.

A left and right pair of rear side members 20 are disposed at the vehicle width direction outer sides of the vehicle rear portion 12 (both of outer sides of the transaxle 16). The rear side members 20 structure portions of a vehicle body of the vehicle 10, extend in the vehicle front-and-rear direction, and are disposed apart in the vehicle width direction. A rear suspension member 22 in a "#" shape in plan view is disposed below the left and right rear side members 20. The transaxle 16 is mounted to the rear suspension member 22 via anti-vibration mounts, which are not shown in the drawings. The HV battery 14 is disposed above the transaxle 16. Above the rear side members 20 at the vehicle width direction inner sides of the rear side members 20, the vehicle body of the vehicle 10 is covered by a deckboard or the like, which is not shown in the drawings, and a luggage compartment 21 is formed. A main space 21S of the luggage compartment 21 is formed at a vehicle width direction middle region of the luggage compartment 21.

In this vehicle 10, in order to lengthen a running distance on a single refill of fuel (hydrogen), three hydrogen tanks are mounted separately at three locations. To be specific, the vehicle 10 is provided with a first hydrogen tank 24, which is disposed at a vehicle central portion with a length direction of the first hydrogen tank 24 in the vehicle front-and-rear direction, a second hydrogen tank 26, which is disposed in front of the transaxle 16 with a length direction of the second hydrogen tank 26 in the vehicle width direction, and a third hydrogen tank 28, which is disposed behind the transaxle 16 with a length direction of the third hydrogen tank 28 in the vehicle width direction. The first to third hydrogen tanks 24, 26 and 28 are connected with one another by piping, which is not shown in the drawings, and are structured so as to supply hydrogen that has been charged into the tanks to a fuel cell stack. The hydrogen tanks 24, 26 and 28 are equipped with, for example, an inner wall layer formed of a metal, a hard resin or the like and an outer wall layer formed by a fiber-reinforced plastic or the like being wound to form multiple layers. Thus, the hydrogen tanks 24, 26 and 28 are structured with high stiffness so as not to be easily deformed by internal gas pressure, an external force during a vehicle collision, or the like.

These structural elements are described in detail below.

—Rear Suspension Member and Transaxle—

The rear suspension member 22 at which the transaxle 16 is mounted is structured as a framework member that supports each of a left and right pair of rear suspensions, which are not shown in the drawings. The rear suspensions support the rear wheels 18 to allow vibrations. As shown in FIG. 1, the rear suspension member 22 includes a left and right pair of side rails 30, a front cross-member 32 and a rear cross-member 34. The side rails 30 extend in the vehicle front-and-rear direction and are spaced apart in the vehicle width direction. The front cross-member 32 and the rear cross-member 34 each extend in the vehicle width direction.

Figure 2:
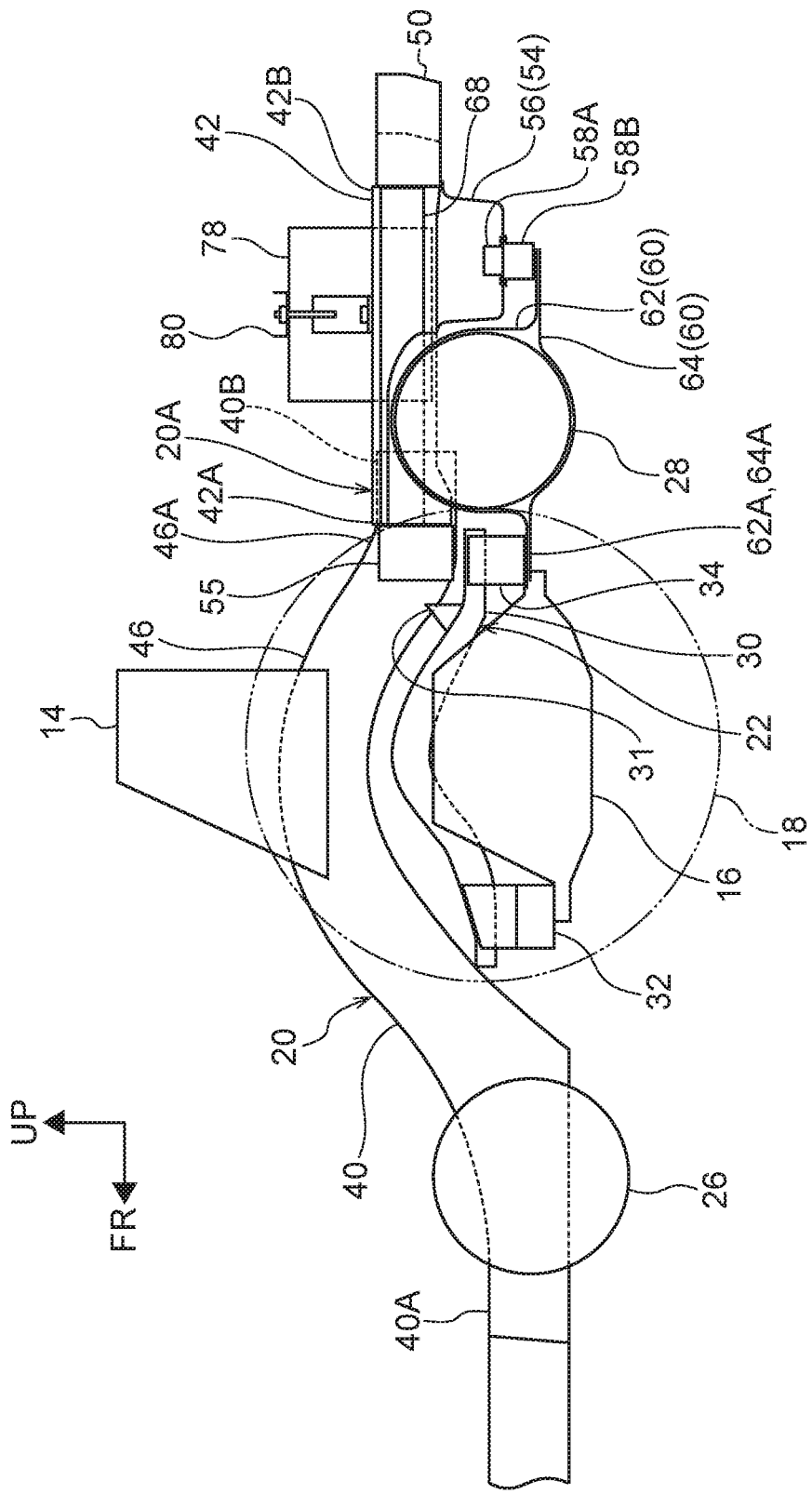
FIG. 2 is a side view showing the vehicle rear portion structure according to the exemplary embodiment of the present disclosure.

As shown in FIG. 1, each side rail 30 is curved such that a vehicle front-and-rear direction central portion 30C is disposed to the vehicle width direction inner side relative to a vehicle front-and-rear direction front portion 30A and rear portion 30B. As shown in FIG. 2, the side rail 30 is also curved such that the central portion 30C is disposed at the vehicle vertical direction upper side relative to the front portion 30A and rear portion 30B in a vehicle side view. The rear suspension member 22 is formed in the "#" shape by the front portions 30A of the left and right side rails 30 being connected in the vehicle width direction by the front cross-member 32 and the rear portions 30B of the left and right side rails 30 being connected in the vehicle width direction by the rear cross-member 34. A load-receiving portion 31 is formed at each side rail 30. The load-receiving portion 31 is provided with a load-receiving surface 31A that faces rearward in the vehicle front-and-rear direction and opposes a floor cross-member 55, which is described below. The load-receiving portion 31 is formed in a protrusion shape provided to stand upward at a position between the central portion 30C and rear portion 30B of the side rail 30. Locations in the vehicle front-and-rear direction at which the side rails 30 are disposed substantially match locations in the vehicle front-and-rear direction of curved portions 46 of the rear side members 20, which are described below.

The transaxle 16 is supported at the front cross-member 32 via two anti-vibration mounts and is supported at the rear cross-member 34 via one anti-vibration mount. Thus, the transaxle 16 is resiliently supported at the rear suspension member 22 at three points. As shown in FIG. 2, the transaxle 16 is disposed to the vehicle front-and-rear direction front of the floor cross-member 55 that is described below. Meanwhile, the rear suspension member 22 is resiliently supported at the left and right rear side members 20 at four points, via insulators that are not shown in the drawings. The insulators are attached to mounting portions 36 and 38 that are formed at, respectively, the front portions 30A and rear portions 30B of the left and right side rails 30. Thus, the rear suspension member 22 structures a portion of the vehicle body of the vehicle 10.

—Rear Side Members—

Figure 5:
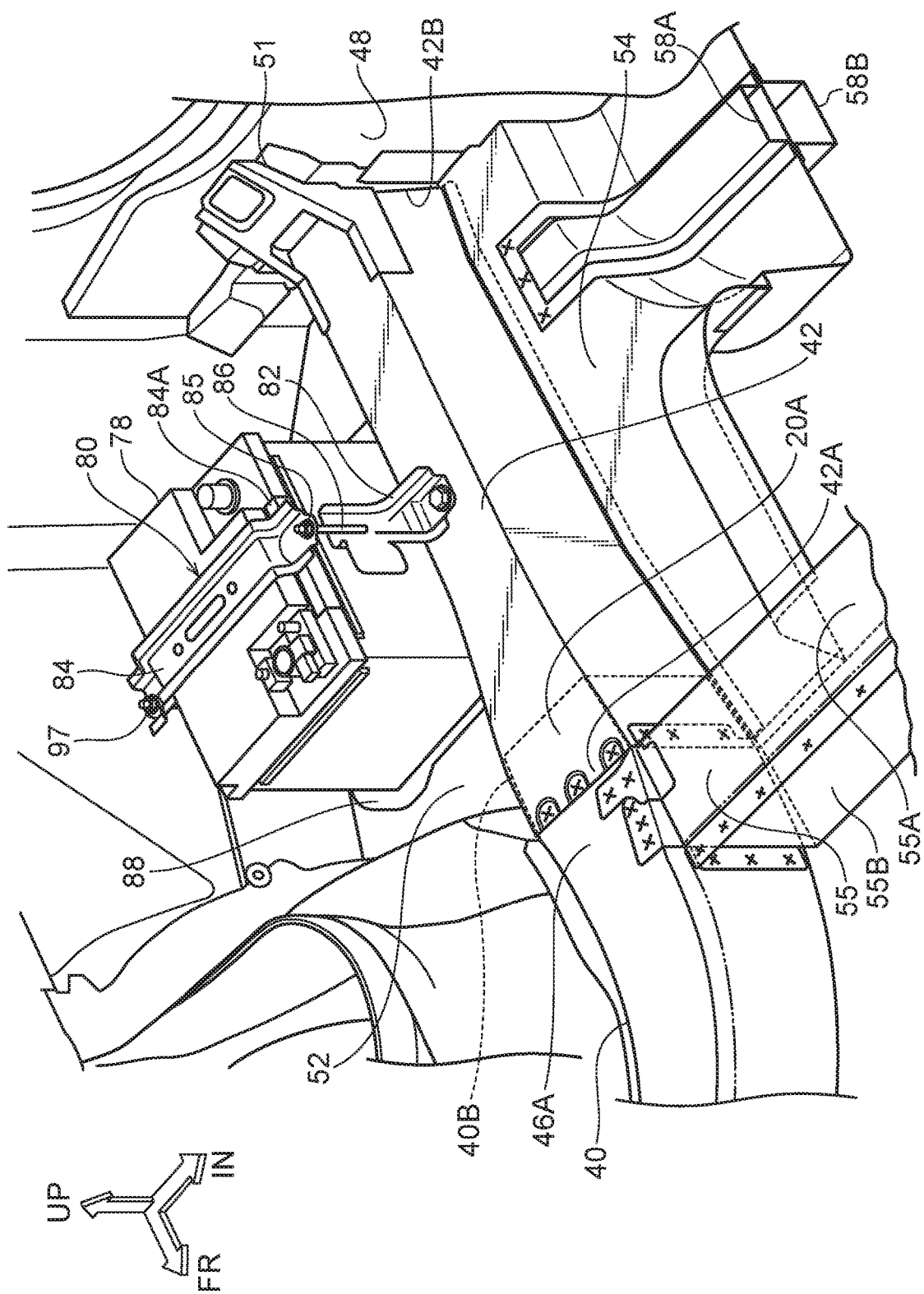
FIG. 5 is a perspective view showing a vicinity of a battery according to the exemplary embodiment of the present disclosure.
Figure 6:
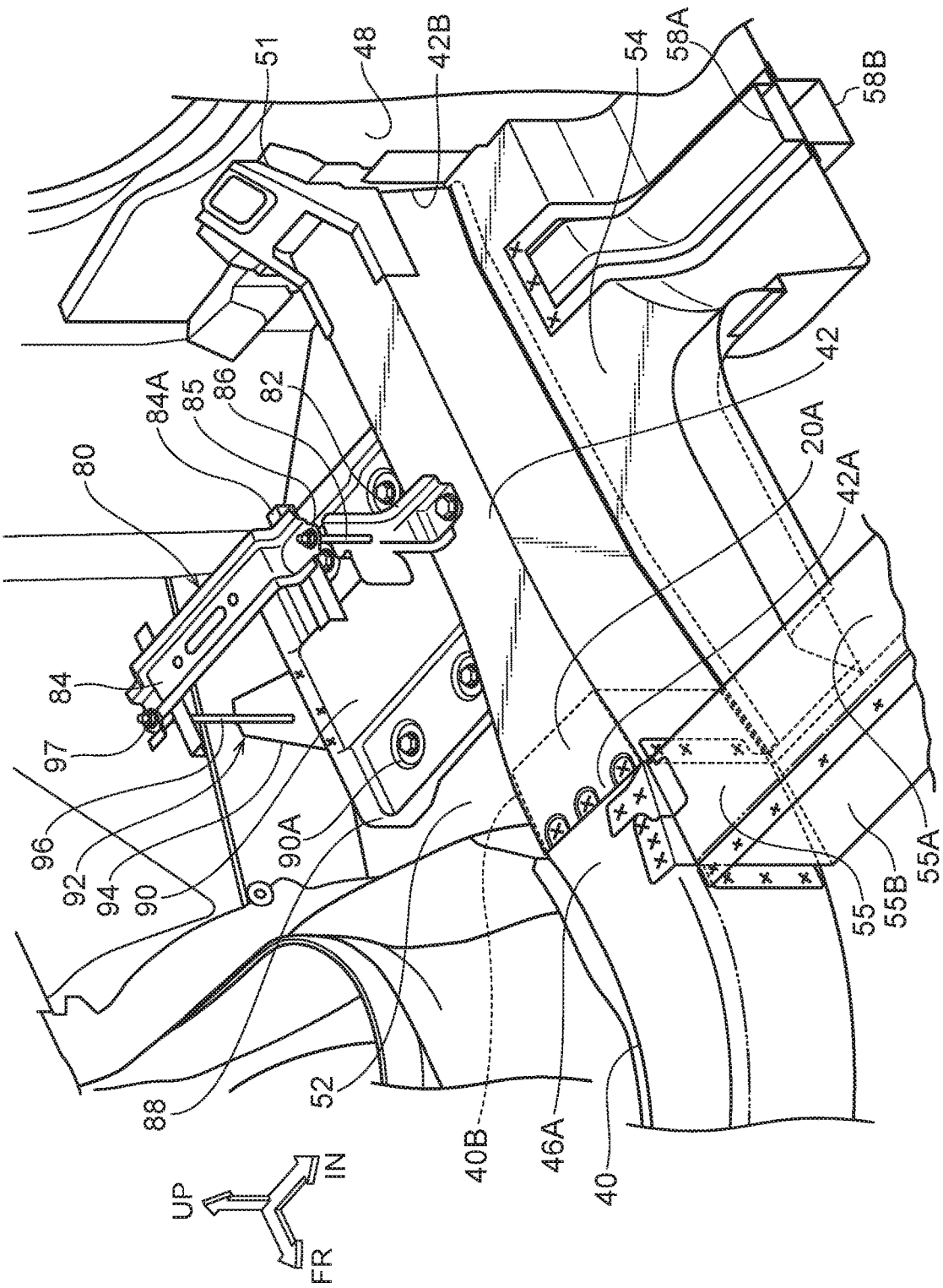
FIG. 6 is a perspective view showing a state in which the battery is removed from FIG. 5.

As shown in FIG. 5 and FIG. 6, each rear side member 20 is structured with a front portion 40 and a rear portion 42. The front portion 40 is a front member that is disposed at the vehicle front-and-rear direction front side, and the rear portion 42 is a rear member that is disposed at the vehicle front-and-rear direction rear side. A front end portion 40A of the front portion 40 is connected to a rear end portion of a rocker 44, which is a framework member structuring the vehicle body. The curved portion 46 is formed at a rear portion of the front portion 40 (more specifically, in the vicinity of a vehicle width direction outer side of the transaxle 16). The curved portion 46 is curved into an upper side protrusion in an arch shape in the vehicle side view. At the curved portion 46, the rear side member 20 is curved such that a vehicle front-and-rear direction central portion 46C of the curved portion 46 is disposed at the vehicle width direction inner side relative to the front end portion 40A and a rear end portion 40B of the front portion 40 (see FIG. 1); the rear side member 20 is also curved such that the central portion 46C of the curved portion 46 is disposed at the vehicle vertical direction upper side relative to the front end portion 40A and rear end portion 40B of the front portion 40 (see FIG. 2).

As shown in FIG. 5 and FIG. 6, a front end portion 42A of the rear portion 42 is connected with a rear end portion 46A of the curved portion 46 of the front portion 40, a rear end portion 42B of the rear portion 42 extends rearward in the vehicle front-and-rear direction, and the rear portion 42 is connected with a rear bumper reinforcement 50 by a flange portion, which is not shown in the drawings, that is provided at the rear end portion 42B. The rear portion 42 is also connected with a rear end panel 48 via a rear portion bracket 51 (see FIG. 5 and FIG. 6) provided at the rear end portion 42B. The rear portion 42 extends rearward in the vehicle front-and-rear direction at the vehicle width direction inner side relative to the rocker 44 (see FIG. 1). In the present exemplary embodiment, a connection portion 20A between the front portion 40 and the rear portion 42 is provided at the rear end portion 46A of the curved portion 46 of the rear side member 20. Thus, the cross section of the rear portion 42 changes at the front end portion 42A.

A cross section of the front portion 40 orthogonal to the extension direction thereof is formed in a rectangular chamber shape. A cross-section of the rear portion 42 orthogonal to the extension direction thereof is formed in a hat shape that opens downward, including flange portions 42C at the vehicle vertical direction lower side thereof. The front portion 40 and rear portion 42 form the connection portion 20A (see FIG. 5 or FIG. 6) by the rear end portion 40B of the front portion 40 being inserted into the front end portion 42A of the rear portion 42 and being spot welded thereto in a superposed state. That is, because the front portion 40 and rear portion 42 are superposed, the connection portion 20A of the rear side member 20 has a two-layer structure of thick plates. Thus, the cross section of the rear side member 20 changes to the rear from the rear end portion 46A of the curved portion 46.

—Rear Side Floor Panel—

Figure 7:
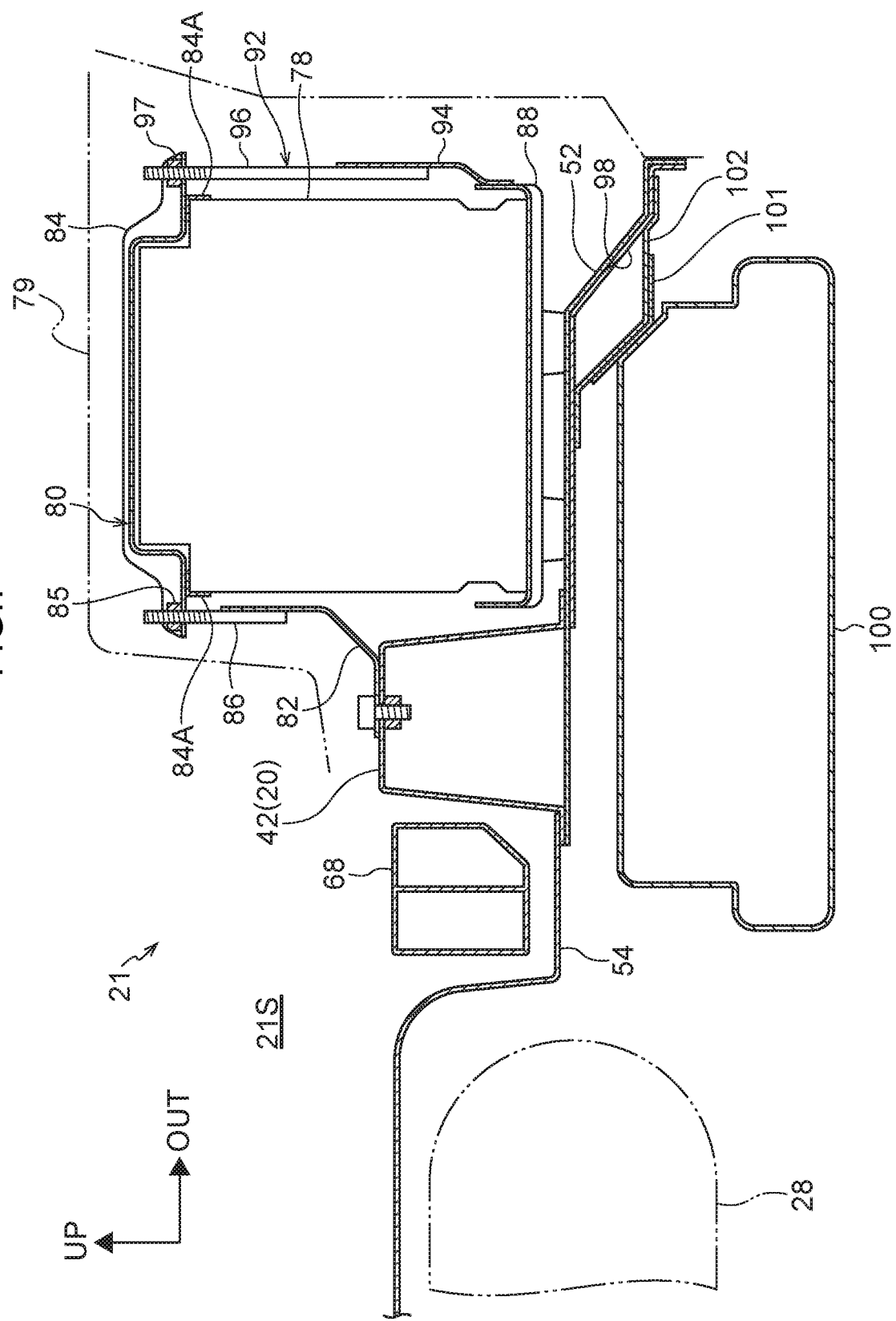
FIG. 7 is a magnified sectional diagram of a vehicle rear view, showing a magnification in a plane cut along line 7-7 in FIG. 1.
Figure 8:
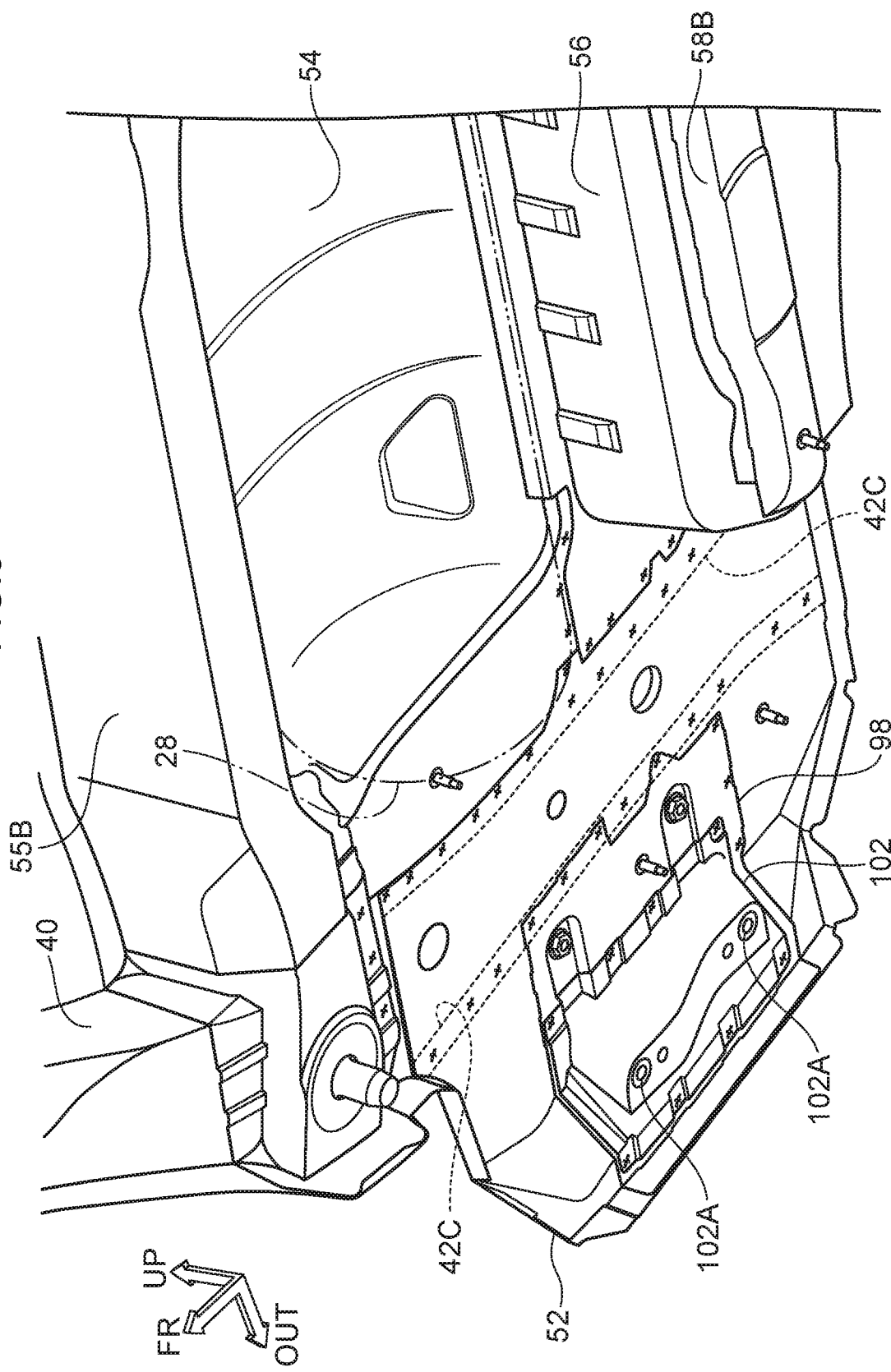
FIG. 8 is a perspective view, seen from the vehicle lower side, showing the vehicle rear portion structure according to the exemplary embodiment of the present disclosure.

As shown in FIG. 7 and FIG. 8, a rear side floor panel 52 that serves as a floor panel is welded to the flange portions 42C of each rear portion 42. A vehicle width direction inner end portion of each rear side floor panel 52 is welded and fixed to the flange portions 42C of the rear portion 42 so as to cover the rear portion 42 that is formed in a hat shape opening downward from the lower side thereof. The rear side floor panel 52 extends to a position at the vehicle width direction outer side relative to the rear side member 20, behind the rear wheel 18 (see FIG. 1). That is, the rear side floor panels 52 are disposed at the vehicle width direction outer sides of the vehicle rear portion 12. A battery carrier 88, which is described below, is fixed to an upper face of one of the rear side floor panels 52. A floor reinforcement 98 and an oil cooler bracket 102, which are described below, are fixed to a lower face of the rear side floor panel 52.

—Floor Cross-Member—

As shown in FIG. 1 to FIG. 6, the third hydrogen tank 28 is at a rear floor pan 54. The floor cross-member 55 extends in the vehicle width direction, spanning between the left and right rear side members 20, in front of the third hydrogen tank 28 (at the vehicle width direction inner side of the rear end portions 46A of the curved portions 46). The floor cross-member 55 is joined to the left and right rear side members 20 from the vehicle width direction inner sides thereof. Second members 68, which are described below, are disposed at the vehicle front-and-rear direction rear of the floor cross-member 55. A cross section of the floor cross-member 55 orthogonal to the extension direction thereof is formed in a rectangular chamber shape. At each of regions of the floor cross-member 55 to which the second members 68 are connected, as described below, the floor cross-member 55 includes a deformation origin portion. The deformation origin portion is formed such that strength of an upper portion thereof is lower than strength of a lower portion thereof. A front face 55B of the floor cross-member 55 that faces forward in the vehicle front-and-rear direction opposes the load-receiving surface 31A of each side rail 30. Note that the second members 68 are not shown in FIG. 4 and FIG. 5.

—Third Hydrogen Tank and Rear Floor Pan—

Figure 3:
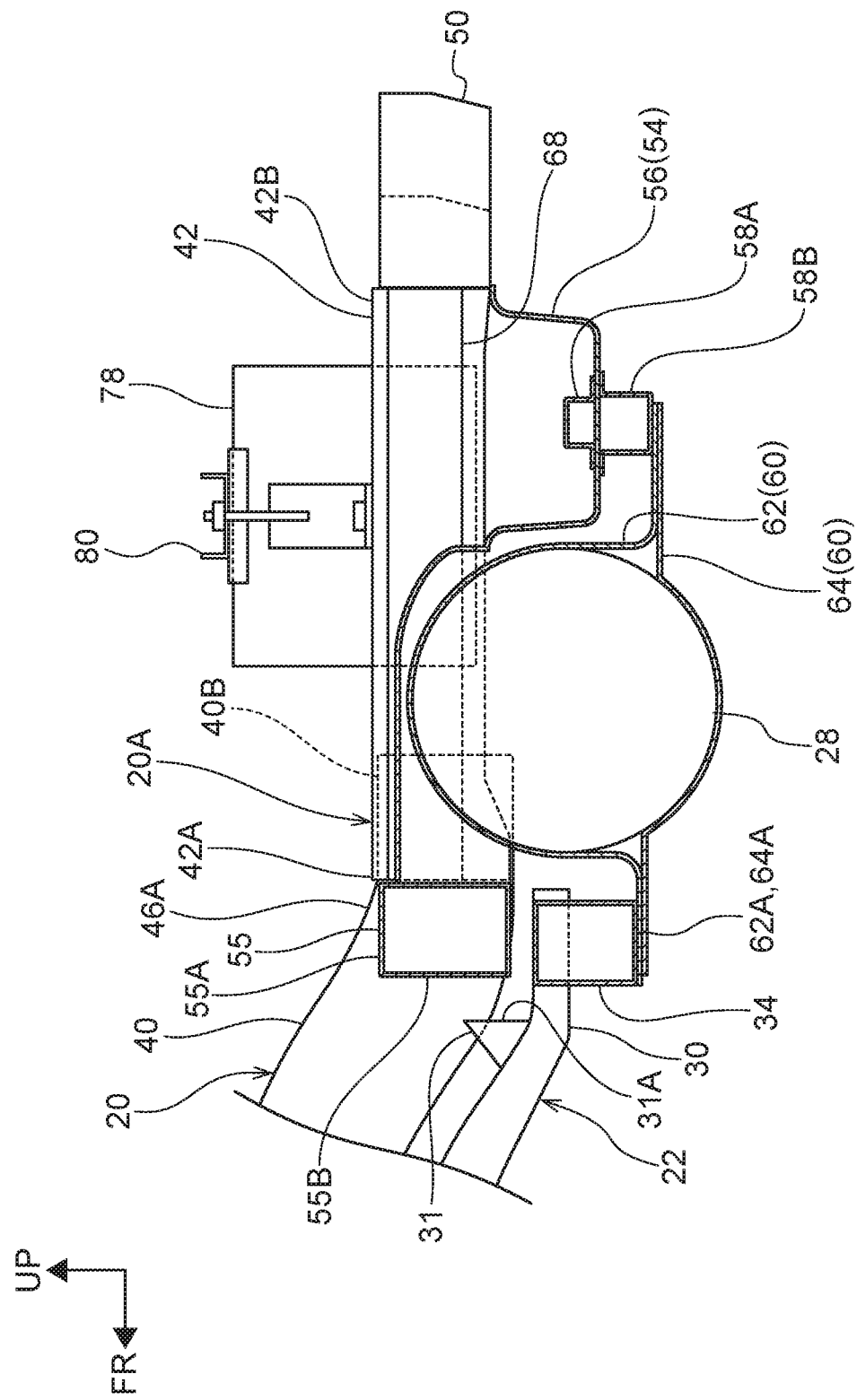
FIG. 3 is a side view showing a magnification of the vehicle rear portion structure according to the exemplary embodiment of the present disclosure.

As shown in FIG. 3 and FIG. 7, the third hydrogen tank 28 is covered from above by the rear floor pan 54. Vehicle width direction outer end portions of the rear floor pan 54 are welded to the flange portions 42C of the rear portions 42 of the left and right rear side members 20, and the rear floor pan 54 spans between the left and right rear portions 42. The rear floor pan 54 bulges into an upper side protrusion toward the vehicle upper side between the left and right rear side members 20, reserving space for mounting of the third hydrogen tank 28. That is, the third hydrogen tank 28 is disposed so as to overlap (be superposed) with the rear side members 20 in a vehicle side view. The rear cross-member 34 of the rear suspension member 22 is disposed in front of the third hydrogen tank 28, below the floor cross-member 55. A projection portion 56 at which the rear floor pan 54 projects downward is provided at the rear floor pan 54 behind the third hydrogen tank 28. A tank reinforcement 58 that extends in the vehicle width direction is attached to the lower side of the projection portion 56.

As shown in FIG. 3, the tank reinforcement 58 includes an upper side reinforcement 58A and a lower side reinforcement 58B. A cross section of the upper side reinforcement 58A orthogonal to the extension direction thereof is a hat shape that is open to the lower side, and a cross section of the lower side reinforcement 58B orthogonal to the extension direction thereof is a hat shape that is open to the upper side. The tank reinforcement 58 is attached to the rear floor pan 54, for example, by welding, such that the projection portion 56 of the rear floor pan 54 is sandwiched from above and below by the upper side reinforcement 58A and lower side reinforcement 58B. In this manner, the tank reinforcement 58 is attached to the projection portion 56 of the rear floor pan 54. Thus, because the rear floor pan 54 is connected with the rear portions 42 of the left and right rear side members 20 as described above, the tank reinforcement 58 is connected with the rear portions 42 of the left and right rear side members 20, and thus with the vehicle body of the vehicle 10, via the rear floor pan 54.

The third hydrogen tank 28 extends in the vehicle front-and-rear direction and is supported by the rear cross-member 34 and the tank reinforcement 58 via a left and right pair of tank bands 60 that are spaced apart in the vehicle width direction. More specifically, each tank band 60 includes an upper side band 62 that forms an upper side protrusion in a substantially semicircular shape in the vehicle side view, and a lower side band 64 that forms a lower side protrusion in a substantially semicircular shape in the vehicle side view. The third hydrogen tank 28 is sandwiched by the upper side bands 62 and the lower side bands 64. Thus, the third hydrogen tank 28 is retained over the whole circumference thereof. A flange 62A at the vehicle front-and-rear direction front side of each upper side band 62, and a flange 64A at the vehicle front-and-rear direction front side of each lower side band 64 are superposed, and the two flanges 62A and 64A are together fastened to a lower end portion of the rear cross-member 34 with a bolt 19. A flange 62B at the vehicle front-and-rear direction rear side of each upper side band 62, and a flange 64B at the vehicle front-and-rear direction rear side of each lower side band 64 are superposed, and the two flanges 62B and 64B are together fastened to a lower end portion of the lower side reinforcement 58B with a bolt that is not shown in the drawings. Thus, the third hydrogen tank 28 is supported by the rear cross-member 34 and the tank reinforcement 58. That is, the third hydrogen tank 28 is fixed to the vehicle body of the vehicle 10 by the third hydrogen tank 28 being supported by the tank bands 60 and the tank bands 60 being fastened to the rear cross-member 34 and the tank reinforcement 58 from the lower side. Further tank brackets that are not shown in the drawings are fixed to the rear floor pan 54 at the vehicle width direction outer sides of the third hydrogen tank 28; both vehicle width direction sides of the third hydrogen tank 28 are supported by these tank brackets. Thus, the third hydrogen tank 28 is further fixed to the vehicle body of the vehicle 10.

—Second Members and Floor Cross-Member—

In the vehicle rear portion structure according to the present exemplary embodiment, as shown in FIG. 1, a left and right pair of second members 68 are provided at the vehicle width direction inner sides of the rear portions 42 of the left and right rear side members 20. The second members 68 extend in the vehicle front-and-rear direction parallel with the rear portions 42 and are spaced apart in the vehicle width direction. As shown in FIG. 2, a cross section of each second member 68 orthogonal to the extension direction thereof is formed as a grille-form chamber. The second member 68 is, for example, an extruded member fabricated of an aluminium alloy. Front ends of the second members 68 are connected to each of two vehicle width direction end portions of an upper face 55A of the floor cross-member 55 that faces upward in the vehicle vertical direction, via bolt-fastening-type second braces 72. Rear end portions 68B of the second members 68 are fastened to the rear bumper reinforcement 50 via bolts or the like, which are not shown in the drawings, and are connected with the rear end panel 48 via rear brackets 69 (see FIG. 4). That is, each second member 68 is linked with the rear side member 20 in the vehicle width direction via the rear end panel 48 and the rear bumper reinforcement 50. The second member 68 and the rear portion 42 of the rear side member 20 are also linked in the vehicle width direction via a bolt-fastening-type first brace 70. With this structure, paths of deformation of the rear portion 42 and the second member 68 during a rear collision tend to synchronize. As described above, because the third hydrogen tank 28 is disposed so as to overlap with the rear side members 20 in the vehicle side view, the third hydrogen tank 28 also overlaps with the second members 68 in the vehicle side view.

Figure 4:
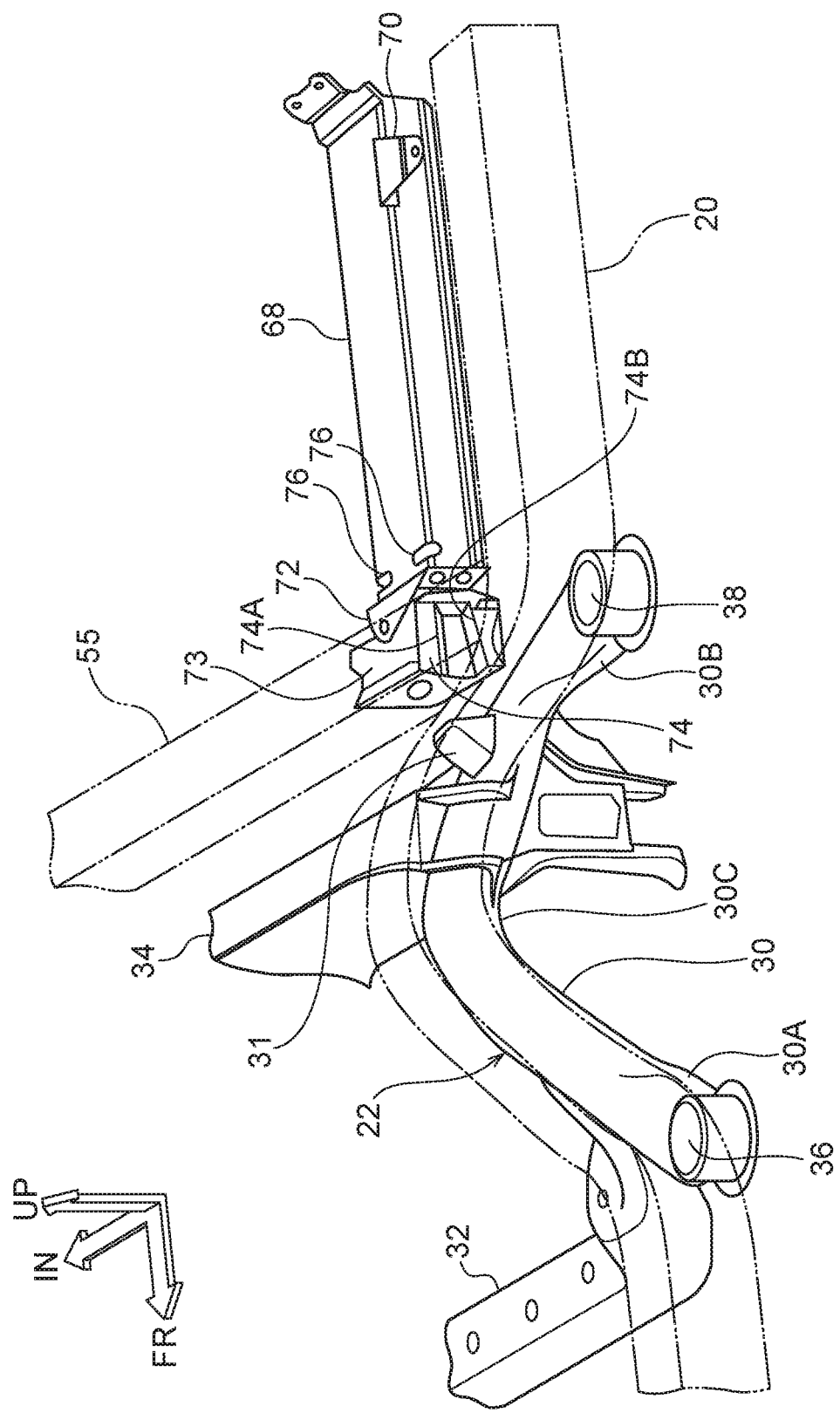
FIG. 4 is a perspective view showing a suspension member, a floor cross-member and a second member according to the exemplary embodiment of the present disclosure.

FIG. 4 is a perspective view schematically describing structures of the rear suspension member 22, the floor cross-member 55 and each second member 68. As described above, the left and right second members 68 are respectively connected with the two vehicle width direction end portions of the upper face 55A of the floor cross-member 55 via the bolt-fastening-type second braces 72. As shown in FIG. 4, a bulkhead 73 that reinforces the floor cross-member 55 is provided inside the floor cross-member 55 at each of the regions at which the second members 68 are connected. The bulkhead 73 is formed in a box shape by, for example, a metal plate being folded into a rectangular frame shape that is open in the vehicle width direction and then a side wall portion 74 that faces to the vehicle width direction outer side being joined thereto. The side wall portion 74 is specified with an upper side ridge line 74A and a lower side ridge line 74B. The upper side ridge line 74A is formed so as to extend substantially horizontally in the vehicle front-and-rear direction, and the lower side ridge line 74B is formed so as to extend at an angle downward toward the vehicle front-and-rear direction front side. That is, each side wall portion 74 of the bulkhead 73 is formed so as to easily transmit a load in the vehicle front-and-rear direction along the upper side ridge line 74A. Thus, a structure is formed such that, when a collision load is transmitted during a rear collision, the upper side ridge line 74A buckles earlier than the lower side ridge line 74B. In other words, the bulkhead 73 is formed such that a yield strength in the vehicle front-and-rear direction of the upper side ridge line 74A is smaller than a yield strength in the vehicle front-and-rear direction of the lower side ridge line 74B. Thus, the bulkhead 73 is structured to serve as a deformation origin portion in which an upper portion is formed to be weaker than a lower portion with respect to a load in the vehicle front-and-rear direction. In this way, the floor cross-member 55 is structured such that strength of an upper portion thereof is lower than strength of a lower portion thereof in each of the regions to which the second members 68 are joined. At least a portion of each bulkhead 73 is disposed so as to be superposed with the side rail 30 of the rear suspension member 22 when seen in the vehicle front-and-rear direction. More specifically, at least a portion of the bulkhead 73 is disposed so as to be superposed with the load-receiving portion 31 when seen in the vehicle front-and-rear direction.

As shown in FIG. 4, crush beads 76 that serve as a deformation origin portion are provided at an upper face side of a front end portion 68A of each second member 68. Thus, the front end portion 68A of the second member 68 is formed such that strength of an upper portion thereof is lower than strength of a lower portion. The crush beads 76 are provided such that ridge lines extending in the vehicle front-and-rear direction at vehicle width direction end portions of the second member 68 are notched. A position of the crush beads 76 in the vehicle front-and-rear direction substantially coincides with a position of the connection portion 20A of each rear side member 20 in the vehicle front-and-rear direction. At least a portion of the front end portion 68A of each second member 68 is disposed so as to be superposed with the side rail 30 of the rear suspension member 22 when seen in the vehicle body front-and-rear direction. More specifically, at least a portion of the front end portion 68A of the second member 68 is disposed so as to be superposed with the load-receiving portion 31 when seen in the vehicle front-and-rear direction. In summary, in the present exemplary embodiment, at least portions of the four members—the front end portion 68A of the second member 68, the floor cross-member 55, the bulkhead 73 and the load-receiving portion 31 of the side rail 30—are disposed so as to be superposed when seen in the vehicle front-and-rear direction.

—Auxiliary Battery—

As shown in FIG. 5 and FIG. 6, an auxiliary battery 78 that serves as a battery is disposed on the rear side floor panel 52 that is at a vehicle width direction outer side (the right side if looking forward in the vehicle) of the rear portion 42 of the rear side member 20. The auxiliary battery 78 is a box-shaped rechargeable battery that primarily supplies electricity to equipment inside the vehicle, such as electronic control units, audio equipment and the like. The auxiliary battery 78 is disposed at the vehicle width direction outer side of the rear portion 42 in a vicinity of a vehicle front-and-rear direction middle portion of the rear portion 42. That is, the auxiliary battery 78 is disposed at the vehicle front-and-rear direction rear relative to the curved portion 46 and connection portion 20A of the rear side member 20 (see FIG. 1). The auxiliary battery 78 is also disposed at the vehicle front-and-rear direction rear relative to the third hydrogen tank 28. More specifically, a central position of the auxiliary battery 78 in the vehicle front-and-rear direction is disposed to the rear relative to a central position in the vehicle front-and-rear direction of the third hydrogen tank 28.

As shown in FIG. 3, the auxiliary battery 78 overlaps with the rear portion 42 of the rear side member 20 in the vehicle side view. In the present exemplary embodiment, because the second member 68 is provided to be parallel with the rear portion 42 of the rear side member 20 at the vehicle width direction inner side of the rear portion 42, the auxiliary battery 78 also overlaps with the second member 68 in the vehicle side view. As shown in FIG. 3, the auxiliary battery 78 is also disposed so as to overlap with the third hydrogen tank 28 in the vehicle side view. The auxiliary battery 78 is covered from above and partitioned from the luggage compartment 21 by a side box cover 79.

—Battery Clamp—

As shown in FIG. 5 and FIG. 6, a battery clamp 80 is provided from the vehicle width direction inner side of the auxiliary battery 78 to an upper portion of the auxiliary battery 78. With the rear side floor panel 52, the battery clamp 80 sandwiches and retains the auxiliary battery 78 from above and below. The battery clamp 80 is structured by an inner side bracket 82, a clamp main body portion 84 and an inner side bar 86. A vehicle width direction inner end portion of the inner side bracket 82 is fixed to the upper face of the rear portion 42 of the rear side member 20 and is formed in an "L" shape in a vehicle front view. The clamp main body portion 84 extends from the vehicle width direction inner side toward the outer side, to the upper portion of the auxiliary battery 78. The inner side bar 86 connects the inner side bracket 82 with the clamp main body portion 84. A lower end of the inner side bar 86 is fixed by welding or the like to the inner side bracket 82, and a helical groove is cut into an upper end of the inner side bar 86. The auxiliary battery 78 is placed on the battery carrier 88, which is described below, after which the inner side bar 86 is inserted into a hole provided at the vehicle width direction inner end of the clamp main body portion 84, and a nut 85 is fastened to the inner side bar 86 from above. Thus, the inner side bracket 82 is connected with the clamp main body portion 84. In this way, the auxiliary battery 78 is sandwiched and retained from above and below, between the rear side floor panel 52 and the battery clamp 80 (see FIG. 7). Thus, because the rear side floor panel 52 and the battery clamp 80 are fixed to the rear portion 42 of the rear side member 20 that structures the vehicle body of the vehicle 10, the auxiliary battery 78 is fixed to the vehicle body of the vehicle 10.

The clamp main body portion 84 extends across from the vehicle width direction inner side to the vehicle width direction outer side of the auxiliary battery 78. A cross section of the clamp main body portion 84 orthogonal to the extension direction thereof is formed in a hat shape that opens upward, raising the strength of the clamp main body portion 84. The clamp main body portion 84 includes a left and right pair of edging portions 84A at two vehicle width direction end portions at the lower side of the clamp main body portion 84. The edging portions 84A extend in the vehicle front-and-rear direction and are formed in "L" shapes in cross section. As shown in FIG. 5, the edging portions 84A restrain edges that extend in the vehicle front-and-rear direction at the two vehicle width direction ends of the box-shaped auxiliary battery 78, retaining the auxiliary battery 78 between the battery clamp 80 and the rear side floor panel 52.

—Battery Carrier—

As shown in FIG. 5, the battery carrier 88 has a flat dish shape and is fixed to the upper side of the rear side floor panel 52. The auxiliary battery 78 is placed on the battery carrier 88. The battery carrier 88 is fixed to the rear side floor panel 52 by bolt-fastening at depressions 90A provided in a floor portion 90 of the battery carrier 88. An outer side connection portion 92 is provided at a vehicle front-and-rear direction middle portion of the battery carrier 88. A lower end of the outer side connection portion 92 is connected with a vehicle width direction outer end portion of the battery carrier 88, the outer side connection portion 92 extends in the vehicle vertical direction at the vehicle width direction outer side of the auxiliary battery 78, and an upper end of the outer side connection portion 92 is connected with the vehicle width direction outer end portion of the clamp main body portion 84. The outer side connection portion 92 is structured by an outer side bracket 94 and an outer side bar 96. A lower end of the outer side bracket 94 is fixed by welding or the like to the vehicle width direction outer end portion of the battery carrier 88, and the outer side bracket 94 is formed in a crank shape in a vehicle front view. A lower end of the outer side bar 96 is fixed by welding or the like to the outer side bracket 94, and a helical groove is cut into an upper end of the outer side bar 96. After the auxiliary battery 78 has been placed on the battery carrier 88, the outer side bar 96 is inserted into a hole provided at the vehicle width direction outer end of the clamp main body portion 84, and a nut 97 is fastened to the outer side bar 96 from above. Thus, the outer side connection portion 92 and the battery clamp 80 are connected.

—Floor Reinforcement—

As shown in FIG. 8, the floor reinforcement 98 is disposed at the lower portion of the rear side floor panel 52. The floor reinforcement 98 is fixed to the rear side floor panel 52, and a vehicle width direction inner end portion of the floor reinforcement 98 is fixed to the rear portion 42 of the rear side member 20. The floor reinforcement 98 extends toward the vehicle width direction outer side below a region in which the auxiliary battery 78 is disposed on the rear side floor panel 52. A vehicle width direction inner end portion of the floor reinforcement 98 is fixed to the rear side member 20 by, for example, welding or the like together with the rear side floor panel 52 at the flange portion 42C that is at the outer end of the rear portion 42 of the rear side member 20. The floor reinforcement 98 reaches to a position below the depressions 90A at which the battery carrier 88 is fixed to the rear side floor panel 52. Further, in the present exemplary embodiment, the floor reinforcement 98 extends along the shape of the rear side floor panel 52 to an outer end portion of the rear side floor panel 52.

—Oil Cooler Bracket—

The oil cooler bracket 102 is provided at a lower portion of the floor reinforcement 98. A connection portion 102A for suspension of an oil cooler 100 is provided at the oil cooler bracket 102. The oil cooler bracket 102 is welded to the floor reinforcement 98 and the rear side floor panel 52, and covers a portion of the floor reinforcement 98 below the battery carrier 88. That is, the oil cooler bracket 102 forms a chamber between the oil cooler bracket 102 and the floor reinforcement 98 when viewed in the vehicle front-and-rear direction. A connecting bracket 101 (see FIG. 7) is attached to the connection portion 102A. The oil cooler 100 is suspended from the oil cooler bracket 102 via this connecting bracket 101.

—Operation and Effects—

Now, operation and effects of the vehicle rear portion structure according to the present exemplary embodiment are described.

In the vehicle 10 equipped with the vehicle rear portion structure according to the present exemplary embodiment, because the auxiliary battery 78 is disposed on the rear side floor panel 52 at the vehicle width direction outer side of the rear side member 20, the auxiliary battery 78 does not narrow the main space 21S at the vehicle width direction middle region of the luggage compartment 21, and usability of the luggage compartment 21 is better. If a collision object 104 collides from the rear of the vehicle 10 (a rear collision), a collision load from the rear bumper reinforcement 50 is borne by the rear side members 20, and the rear side members 20 deform. Even when the rear side members 20 are deformed, sandwiching of the auxiliary battery 78 between the third hydrogen tank 28 and the collision object 104 may be suppressed because the auxiliary battery 78 and the third hydrogen tank 28 are offset in the vehicle width direction. Hence, because sandwiching of the auxiliary battery 78 between the third hydrogen tank 28 and the collision object 104 is suppressed, a large external force is unlikely to act on the auxiliary battery 78, and the auxiliary battery 78 is unlikely to be deformed. Therefore, the auxiliary battery 78 can be retained between the battery clamp 80 and the rear side floor panel 52, and the fixing state of the auxiliary battery 78 to the vehicle body of the vehicle 10 can be maintained.

In the vehicle 10 equipped with the vehicle rear portion structure according to the present exemplary embodiment, when the collision object 104 collides from the rear of the vehicle 10 (a rear collision), the impact is broadly divided and two load transmission paths are produced in the vehicle rear portion 12: (1) a path at the rear side member 20 side; and (2) a path at the second member 68 side.

(1) Action of the Load Transmission Path at the Rear Side Member Side

Figure 9:
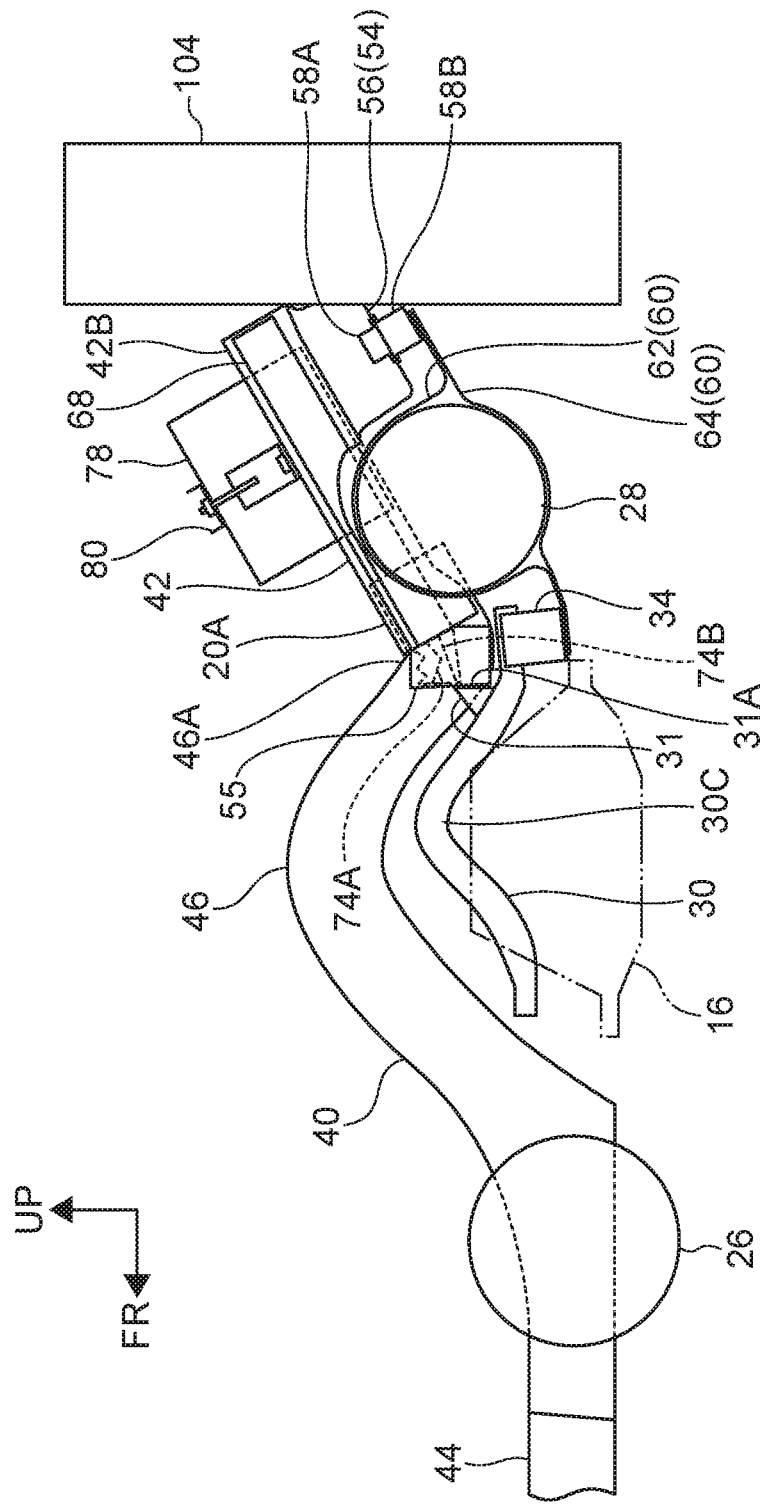
FIG. 9 is a side view schematically showing deformation of the vehicle rear portion structure according to the exemplary embodiment of the present disclosure during a rear collision.

FIG. 9 is a diagram schematically describing an action of each rear side member 20 and the third hydrogen tank 28 during a rear collision. When the collision object 104 collides with the rear bumper reinforcement 50, a load transmitted to the rear side member 20 side is transmitted through the rear side member 20 to the rocker 44. In this process, the rear end portion 46A of the curved portion 46 produces a reaction force to the collision load toward the rear portion 42 of the rear side member 20, while the collision load is absorbed by deformation of the curved portion 46 that is curved into an upper side protrusion in an arch shape. Because the curved portion 46 is curved into the upper side protrusion in the arch shape, a radius of curvature of the rear end portion 46A of the curved portion 46 is smaller at the face at the upper side of the rear side member than at the face at the lower side. Thus, the rear end portion 46A of the curved portion 46 forms a lower side protrusion, and the rear end portion 42B of the rear portion 42 is pushed by the collision object 104 and lifted upward. Therefore, energy is steadily absorbed during the rear collision.

In the present exemplary embodiment, the rear end portion 46A of the curved portion 46 of the rear side member 20 forms the lower side protrusion, and the rear end portion 42B of the rear portion 42 deforms so as to be lifted upward and steadily absorbs energy during the rear collision. Therefore, a large external force is unlikely to act on the auxiliary battery 78, and the battery clamp 80 is unlikely to be deformed. Here, because the rear side floor panel 52 below the auxiliary battery 78 is reinforced by the floor reinforcement 98 and the vehicle width direction inner end portion of the floor reinforcement 98 is fixed to the rear side member 20, when the rear end portion 42B of the rear portion 42 is deformed so as to be lifted upward, the auxiliary battery 78 may be lifted up integrally with the rear side floor panel 52, tracking the deformation of the rear side member 20. When the auxiliary battery 78 can be caused to track the deformation of the rear side member 20, because the battery clamp 80 is unlikely to be deformed, the fixed state of the auxiliary battery 78 to the vehicle body of the vehicle 10 may be maintained. Furthermore, because the auxiliary battery 78 is disposed to the rear relative to the third hydrogen tank 28, the auxiliary battery 78 has a larger movement amount in the vehicle vertical direction than the third hydrogen tank 28. As a result, sandwiching of the auxiliary battery 78 between the third hydrogen tank 28 and the collision object 104 may be suppressed.

In the present exemplary embodiment, the rear side floor panel 52 below the auxiliary battery 78 is further reinforced by a chamber being formed at the lower portion of the floor reinforcement 98, between the floor reinforcement 98 and the oil cooler bracket 102 covering a portion of the floor reinforcement 98. Consequently, the auxiliary battery 78 may track a deformation of the rear side member 20, and the fixed state of the auxiliary battery 78 to the vehicle body of the vehicle 10 may be maintained.

In the present exemplary embodiment, the vehicle width direction outer end portion of the clamp main body portion 84 of the battery clamp 80 and the vehicle width direction outer end portion of the battery carrier 88 are connected by the outer side connection portion 92. Therefore, the auxiliary battery 78 is encircled in a ring shape by the rear side member 20, the battery clamp 80, the outer side connection portion 92, the battery carrier 88 and the rear side floor panel 52. As a result, the auxiliary battery 78 is easily retained between the battery clamp 80 and the rear side floor panel 52, and the fixed state of the auxiliary battery 78 to the vehicle body of the vehicle 10 is easily maintained.

In the present exemplary embodiment, because the auxiliary battery 78 overlaps with the rear side member 20 in the vehicle side view, production of dead space may be suppressed compared to, for example, a structure in which the auxiliary battery 78 is provided above the rear side member 20. Furthermore, because the auxiliary battery 78 and the third hydrogen tank 28 are separated by the rear side member 20, sandwiching of the auxiliary battery 78 between the third hydrogen tank 28 and the collision object 104 may be further suppressed.

Because the auxiliary battery 78 and the third hydrogen tank 28 are also separated by the second member 68 in the present exemplary embodiment, sandwiching of the auxiliary battery 78 between the third hydrogen tank 28 and the collision object 104 may be even further suppressed.

In the present exemplary embodiment, the front end portion 42A of the rear portion 42 of each rear side member 20 is connected to the rear end portion 46A of the curved portion 46. Thus, stress causing a change in cross section tends to concentrate at the front end portion 42A of the rear portion 42, and the front end portion 42A of the rear portion 42 is likely to be an origin of deformation of the rear side member 20. As a result, the rear end portion 42B of the rear portion 42 is pushed by the collision object 104 and lifted upward, and energy of the rear collision is steadily absorbed.

Because the rear end portion 42B of each rear portion 42 deforms so as to be lifted upward and energy of the rear collision is steadily absorbed, a large external force is unlikely to act on the auxiliary battery 78 and the battery clamp 80 is unlikely to deform. Therefore, the auxiliary battery 78 is retained between the battery clamp 80 and the rear side floor panel 52; that is, the fixed state of the auxiliary battery 78 to the vehicle body of the vehicle 10 is maintained.

In the vehicle rear portion structure according to the present exemplary embodiment, the tank reinforcement 58 is disposed with the length direction thereof in the vehicle width direction and is connected with the left and right rear portions 42 of the rear side members 20, and the tank bands 60 supporting the third hydrogen tank 28 are fastened to the tank reinforcement 58. Therefore, the third hydrogen tank 28 is moved forward and upward when the rear end portion 42B of the rear portion 42 is lifted upward. Thus, because the third hydrogen tank 28 is moved forward, which is the side further from a collision location, protection performance of the third hydrogen tank 28 may be raised.

(2) Action of the Load Transmission Path at the Second Member Side

In the transmission path at the second member 68 side, because the front end of each second member 68 is connected to the floor cross-member 55, a collision load that is applied from the vehicle rear during a rear collision is transmitted through the second member 68 to the floor cross-member 55, and is then transmitted through the rear side member 20 to the rocker 44.

When the floor cross-member 55 receives a collision load from each rear side member 20 and second member 68 and moves forward, the floor cross-member 55 abuts against the load-receiving portions 31 of the side rails 30 of the rear suspension members 22, and the front face 55B of the floor cross-member 55 with the rectangular cross section abuts against the load-receiving surfaces 31A. At this time, each rear suspension member 22 produces a reaction force in the floor cross-member 55 via the load-receiving portion 31 of the side rail 30 in response to the collision load from the vehicle rear, while the rear suspension member 22 deforms into an upper side protrusion starting from the central portion 30C of the side rail 30. Therefore, energy is steadily absorbed during the rear collision.

In the present exemplary embodiment, the floor cross-member 55 includes the deformation origin portion at the region of the floor cross-member 55 at which each second member 68 is connected, which is formed with the strength of the upper portion being lower than the strength of the lower portion. Thus, an upper portion is formed to be weaker than a lower portion at the front end portion of the second member 68. Therefore, the second member 68 connected to the floor cross-member 55 is easily tilted forward and the rear end portion 68B thereof lifted upward by a reaction force caused in the floor cross-member 55 by the rear suspension member 22. Therefore, energy is steadily absorbed during the rear collision.

More specifically, each side wall portion 74 of the bulkhead 73 that serves as a deformation origin portion reinforcing the floor cross-member 55 is structured so as to easily transmit a load in the vehicle front-and-rear direction along the upper side ridge line 74A, and the side wall portion 74 is structured such that the upper side ridge line 74A buckles earlier than the lower side ridge line 74B when the collision load is transmitted during the rear collision. Therefore, when the collision load is applied through the second member 68 to the floor cross-member 55 during the rear collision, a compression amount of the upper side ridge line 74A is larger than a compression amount of the lower side ridge line 74B. Thus, a deformation (compression) amount of the upper portion of the floor cross-member 55 is larger than a deformation amount of the lower portion. Hence, the second member 68 connected to the floor cross-member 55 tilts forward and the rear end portion 68B is easily lifted upward. Therefore, energy is steadily absorbed during the rear collision.

Because the crush beads 76 that serve as a deformation origin portion are provided at the front end portion 68A of each second member 68 such that the ridge lines extending in the vehicle front-and-rear direction at the vehicle width direction end portions of the upper face side of the second member 68 are notched, the strength of the upper portion of the front end portion 68A is lower than the strength of the lower portion. Thus, a compression amount of the upper face side of the front end portion 68A of the second member 68 is larger than a compression amount of the lower face side. Therefore, the second member 68 tilts forward and the rear end portion 68B is easily lifted upward. Thus, energy is steadily absorbed during the rear collision.

Because the second member 68 is connected with the rear portion 42 of the rear side member 20 via the first brace 70, paths of deformation of the second member 68 and the rear portion 42 during the rear collision tend to synchronize. Thus, the collision load may be absorbed more steadily by the vehicle rear portion 12. When the rear end portion 42B of the rear portion 42 of the rear side member 20 is deformed so as to lift upward and energy is steadily absorbed during the rear collision, a large external force is unlikely to act on the auxiliary battery 78.

The rear end portion 68B of the second member 68 is lifted up after an energy absorption required during an initial period of a collision has been assured. Hence, because an intrusion direction of the collision object 104 (the vehicle front-and-rear direction) is different from the direction of extension of the second member 68, a load transmission amount from the second member 68 to the vehicle front side thereof is reduced. Therefore, operation of an excessive load on the transaxle 16 that is mounted at the rear suspension member 22 may be suppressed. Furthermore, operation of an excessive load on the HV battery 14 disposed at the upper side of the transaxle 16, which HV battery 14 is not shown in the drawings, may be suppressed.

As described hereabove, according to the vehicle rear portion structure according to the present exemplary embodiment, usability of the luggage compartment 21 is good, sandwiching of the auxiliary battery 78 between the third hydrogen tank 28 and the collision object 104 during a rear collision of the vehicle 10 may be suppressed, and even when the rear side members 20 are deformed during a rear collision, the fixed state of the auxiliary battery 78 to the vehicle body may be maintained and the battery may be protected. In other words, both usability of the luggage compartment 21 and protection performance of the auxiliary battery 78 during a rear collision may be improved.

—Supplementary Descriptions of the Present Exemplary Embodiment—

The present disclosure is not limited by the exemplary embodiment described above.

For example, in the exemplary embodiment described above, the curved portion 46 that is curved into an upper side protrusion in an arch shape is provided at each rear side member 20. However, the curved portion 46 need not be provided at the rear side member 20.

As a further example, in the exemplary embodiment described above, the floor reinforcement 98 that is fixed to the rear side floor panel 52 is provided at the lower portion of the rear side floor panel 52, but the floor reinforcement 98 need not be provided. In the exemplary embodiment described above, the floor reinforcement 98 extends toward the vehicle width direction outer side from the flange portion 42C that is at the outer end of the rear portion 42 of the rear side member 20. However, the floor reinforcement 98 may extend toward the vehicle width direction outer side from the flange portion 42C that is at the inner side of the rear portion 42.

As a further example, in the exemplary embodiment described above, the oil cooler bracket 102 is provided that is fixed to the rear side floor panel 52 at the lower portion of the floor reinforcement 98, so as to cover a portion of the floor reinforcement 98, and forms a chamber between the oil cooler bracket 102 and the floor reinforcement 98. However, the oil cooler bracket 102 need not be provided. Moreover, an end portion of the chamber formed between the oil cooler bracket 102 and the floor reinforcement 98 may be left open.

As a further example, in the exemplary embodiment described above, the battery carrier 88 on which the auxiliary battery 78 is placed is provided between the auxiliary battery 78 and the rear side floor panel 52, but the battery carrier 88 need not be provided. In the exemplary embodiment described above, the outer side connection portion 92 that connects the vehicle width direction outer end portion of the battery clamp 80 with the vehicle width direction outer end portion of the battery carrier 88 is provided, but need not be provided.

As a further example, in the exemplary embodiment described above, the auxiliary battery 78 and the rear side members 20 overlap in the vehicle side view, but need not overlap.

As a further example, in the exemplary embodiment described above, the second members 68 are provided at the vehicle width direction inner sides of the rear side members 20, but the second members 68 need not be provided.

As a further example, in the exemplary embodiment described above, each rear side member 20 is formed of the front portion 40, at which the curved portion 46 is formed, and the rear portion 42, which is connected to the front portion 40 at the rear end portion 46A of the curved portion 46 and extends to the vehicle front-and-rear direction rear. However, this is not limiting; the rear side member 20 may be formed as a single body.

As a further example, in the exemplary embodiment described above, the auxiliary battery 78 that supplies electricity to vehicle interior equipment is disposed on the rear side floor panel 52 at the vehicle width direction outer side of the rear side members 20. However, this is not limiting; an HV battery for driving may be disposed at a vehicle width direction outer side of the rear side members 20.

As a further example, in the exemplary embodiment described above, locations in the vehicle front-and-rear direction at which the side rails 30 of the rear suspension members 22 are disposed substantially match locations in the vehicle front-and-rear direction of the curved portions 46 of the rear side members 20. However, this is not limiting; the locations in the vehicle front-and-rear direction at which the side rails 30 of the rear suspension members 22 are disposed need not match the locations in the vehicle front-and-rear direction of the curved portions 46 of the rear side members 20.

As a further example, in the exemplary embodiment described above, the bulkhead 73 whose upper portion is weaker than the lower portion is disposed inside the floor cross-member 55 at the region at which each second member 68 is connected with the floor cross-member 55, and the bulkhead 73 is formed such that the upper portion of the floor cross-member 55 is weaker than the lower portion. However, this is not limiting. A crush bead may be provided at the upper face 55A of the floor cross-member 55, and a deformation origin portion formed such that the upper portion of the floor cross-member 55 is weaker than the lower portion in the region at which the second member 68 is connected.

As a further example, in the exemplary embodiment described above, the bulkhead 73 is provided inside the cross section of the floor cross-member 55, and the upper side ridge line 74A of the side wall portion 74 of the bulkhead 73 is formed so as to extend in the vehicle front-and-rear direction substantially horizontally, whereas the lower side ridge line 74B is formed so as to extend at an angle downward toward the vehicle front-and-rear direction front side, but this is not limiting. The upper side ridge line 74A may be formed such that a yield strength in the vehicle front-and-rear direction of the upper side ridge line 74A is weaker than a yield strength in the vehicle front-and-rear direction of the lower side ridge line 74B by the upper side ridge line 74A being notched by a bead. Further, the upper portion of the bulkhead 73 may be formed to be weaker than the lower portion by the lower side ridge line 74B being provided at the bulkhead 73 but the upper side ridge line 74A not being formed.

As a further example, in the exemplary embodiment described above, the crush beads 76 are provided at the upper face of the front end portion of each second member 68, but the crush beads 76 need not be provided.

As a further example, in the exemplary embodiment described above, each second member 68 is connected with the rear portion 42 of the rear side member 20 via the first brace 70, but this is not limiting; the second member 68 need not be connected with the rear portion 42 of the rear side member 20.

As a further example, in the exemplary embodiment described above, each second member 68 is formed by an extrusion member fabricated of an aluminium alloy, whose cross section orthogonal to the extension direction thereof is formed as a grille-form chamber, but this is not limiting. The second member 68 may be formed by combining two members with hat-shaped cross sections fabricated of steel to form a chamber.

If the second members 68 and a rear side member Rr portion 13 are connected by welding via the rear floor pan 54, then as shown in FIG. 7B, left and right second members 23 are welded to the vehicle width direction inner sides of the left and right rear side member Rr portions 13, and a third hydrogen tank 5 is disposed between the left and right second members 23.

Hereabove, a vehicle rear portion structure according to an exemplary embodiment of the present disclosure is described. It will be clear that numerous embodiments are possible within a scope not departing from the gist of the present disclosure.

The vehicle rear portion structure according to the present exemplary embodiment described above may be considered from a different perspective. For example, the problem (and object) to be solved by the vehicle rear portion structure according to the present exemplary embodiment may be considered as "to control deformation of the vehicle rear portion during a rear collision and make energy absorption during the rear collision steady".

When the problem is considered as described above, a means for solving the problem is, for example, as follows.

"A vehicle rear portion structure including:
a left and right pair of rear side members that structure portions of a vehicle body at a vehicle rear portion, the rear side members extending in the vehicle front-and-rear direction and being disposed apart in the vehicle width direction;
a floor cross-member that spans between the left and right rear side members, the floor cross-member being joined to the left and right rear side members from the vehicle width direction inner sides thereof;
a left and right pair of second members, front ends of which are connected to the floor cross-member, the second members extending in the vehicle front-and-rear direction at the vehicle width direction inner sides of the pair of rear side members and being linked with the pair of rear side members in the vehicle width direction; and deformation origin portions at at least one of positions of the floor cross-member at which the second members 68 are connected or front end portions of the second members, upper portions of the deformation origin portions being formed to be weaker than lower portions thereof."

According to the structure described above, the deformation origin portions at each of which an upper portion is formed to be weaker than a lower portion are included at one or both of the regions of the floor cross member at which the second members 68 are connected and the front end portions of the second member. Therefore, during a rear collision, a compression amount of the upper face side of the front end portion of each second member is greater than a compression amount of the lower face side. As a result, the second member 68 tilts forward and lifting upward of the rear end portion of the second member is induced. Because the rear side member is linked with the second member in the vehicle width direction, deformation of the rear side member and deformation of the second member are synchronized, and the rear end portions deform so as to lift up. Thus, deformation of the vehicle body rear portion is controlled and energy is steadily absorbed during the rear collision.

What is claimed is:

1. A vehicle rear portion structure comprising:
a left and right pair of rear side members that structure portions of a vehicle body at a vehicle rear portion, the rear side members extending in the vehicle front-and-rear direction and being disposed apart in the vehicle width direction;
a hydrogen tank that is disposed between the left and right pair of rear side members and is fixed to the vehicle body;
a floor panel that is disposed at a vehicle width direction outer side of the vehicle rear portion, a vehicle width direction inner end portion of the floor panel being fixed to one of the rear side members and the floor panel extending to the vehicle width direction outer side relative to one of the rear side members;
a battery that is disposed on the floor panel at the vehicle width direction outer side of one of the rear side members; and
a battery clamp, a vehicle width direction inner end portion of which is fixed to one of the rear side members, the battery clamp extending toward the vehicle width direction outer side to an upper portion of the battery, and the battery clamp and the floor panel sandwiching and retaining the battery from above and below,
wherein each rear side member includes a curved portion that is curved into an upper side protrusion in an arch shape in a vehicle side view, each rear side member extends in the vehicle front-and-rear direction to the vehicle front-and-rear direction rear relative to the curved portion, and the battery is disposed on the floor panel at the vehicle width direction outer side of one of the rear side members at the vehicle front-and-rear direction rear side relative to the curved portion.

2. The vehicle rear portion structure according to claim 1, further comprising:
a battery carrier that is fixed to the floor panel between the battery and the floor panel, the battery being placed on the battery carrier; and
an outer side connection portion that extends in the vehicle vertical direction at the vehicle width direction outer side of the battery, an upper end of the outer side connection portion being connected with a vehicle width direction outer end portion of the battery clamp, and a lower end of the outer side connection portion being connected with a vehicle width direction outer end portion of the battery carrier.

3. The vehicle rear portion structure according to claim 1, wherein the battery and the rear side members overlap in a vehicle side view.

4. The vehicle rear portion structure according to claim 3, further comprising a left and right pair of second members that extend in the vehicle front-and-rear direction at the vehicle width direction inner sides of the pair of rear side members.

5. The vehicle rear portion structure according to claim 1, further comprising a bumper reinforcement member affixed to a rear side of the pair of rear side members.

6. The vehicle rear portion structure according to claim 1, wherein the curved portion of each rear side member is also curved inward in a vehicle top-down view.

7. The vehicle rear portion structure according to claim 1, further comprising a rear suspension member connected to an underside of the pair of rear side members, the rear suspension member comprising a left and right pair of side rails that extend in the vehicle front-and-rear direction, a front cross member, and a rear cross member, the front and rear cross members extending in the vehicle width direction.

8. The vehicle rear portion structure according to claim 7, further comprising a transaxle connected to an underside of the front cross member and an underside of the rear cross member.

9. A vehicle rear portion structure comprising:
a left and right pair of rear side members that structure portions of a vehicle body at a vehicle rear portion, the rear side members extending in the vehicle front-and-rear direction and being disposed apart in the vehicle width direction;
a hydrogen tank that is disposed between the left and right pair of rear side members and is fixed to the vehicle body;
a floor panel that is disposed at a vehicle width direction outer side of the vehicle rear portion, a vehicle width direction inner end portion of the floor panel being fixed to one of the rear side members and the floor panel extending to the vehicle width direction outer side relative to one of the rear side members;
a battery that is disposed on the floor panel at the vehicle width direction outer side of one of the rear side members; and
a battery clamp, a vehicle width direction inner end portion of which is fixed to one of the rear side members, the battery clamp extending toward the vehicle width direction outer side to an upper portion of the battery, and the battery clamp and the floor panel sandwiching and retaining the battery from above and below,
wherein each rear side member includes a curved portion that is curved into an upper side protrusion in an arch shape in a vehicle side view, each rear side member extends in the vehicle front-and-rear direction to the vehicle front-and-rear direction rear relative to the curved portion, and the battery is disposed on the floor panel at the vehicle width direction outer side of one of the rear side members at the vehicle front-and-rear direction rear side relative to the curved portion; and the vehicle rear portion structure further includes a floor reinforcement that is fixed to the floor panel at a lower portion of the floor panel, a vehicle width direction inner end portion of the floor reinforcement being fixed to one of the rear side members, and the floor reinforcement extending toward the vehicle width direction outer side to a location at which the battery is disposed on the floor panel.

10. The vehicle rear portion structure according to claim 9, further comprising a bracket that is fixed to the floor reinforcement at a lower portion of the floor reinforcement, the bracket forming a chamber between the bracket and the floor reinforcement as viewed in the vehicle front-and-rear direction.

11. The vehicle rear portion structure according to claim 10, wherein each rear side member includes:
- a front member at which the curved portion is formed; and
- a rear member that is connected with the front member at a rear end portion of the curved portion and that extends to the vehicle front-and-rear direction rear.

12. The vehicle rear portion structure according to claim 9, further comprising:
- a battery carrier that is fixed to the floor panel between the battery and the floor panel, the battery being placed on the battery carrier; and
- an outer side connection portion that extends in the vehicle vertical direction at the vehicle width direction outer side of the battery, an upper end of the outer side connection portion being connected with a vehicle width direction outer end portion of the battery clamp, and a lower end of the outer side connection portion being connected with a vehicle width direction outer end portion of the battery carrier.

13. The vehicle rear portion structure according to claim 12, wherein each rear side member includes:
- a front member at which the curved portion is formed; and
- a rear member that is connected with the front member at a rear end portion of the curved portion and that extends to the vehicle front-and-rear direction rear.

14. The vehicle rear portion structure according to claim 9, wherein the battery and the rear side members overlap in a vehicle side view.

15. The vehicle rear portion structure according to claim 14, further comprising a left and right pair of second members that extend in the vehicle front-and-rear direction at the vehicle width direction inner sides of the pair of rear side members.

16. The vehicle rear portion structure according to claim 15, wherein each rear side member includes:
- a front member at which the curved portion is formed; and
- a rear member that is connected with the front member at a rear end portion of the curved portion and that extends to the vehicle front-and-rear direction rear.

17. The vehicle rear portion structure according to claim 15, wherein each rear side member includes:
- a front member at which the curved portion is formed; and
- a rear member that is connected with the front member at a rear end portion of the curved portion and that extends to the vehicle front-and-rear direction rear.

18. The vehicle rear portion structure according to claim 9, wherein each rear side member includes:
- a front member at which the curved portion is formed; and
- a rear member that is connected with the front member at a rear end portion of the curved portion and that extends to the vehicle front-and-rear direction rear.

* * * * *